3,397,709
CYLINDRICAL PROCESSING CONTAINER
Kuno Eisenburger, Wels-Thalheim,
Gut am Hummelberg, Austria
Filed June 6, 1966, Ser. No. 555,349
Claims priority, application Austria, June 11, 1965,
A 5,326/65
9 Claims. (Cl. 134—132)

ABSTRACT OF THE DISCLOSURE

A vertical, substantially cylindrical processing container is disclosed as having at least one charging platform mounted along the periphery of an upper part thereof. A wall bounds each platform on the outside, and each platform tapers in width radially inwardly in the circumferential direction. Thereby material forced along each platform falls off the radially inner edge thereof into the main body of the container.

Background of the invention

The invention concerns a charging device on vertical, cylindrical processing containers, particularly processing containers sealed against the outside atmoshpere—such as, for example, autoclaves, mixing containers, or on thermal reaction containers of all kinds for the smelting, combustion and/or melting of materials—for the uniform introduction of material.

In many technical fields, vertical, cylindrical processing containers are used for a very wide variety of purposes, and for carrying out various kinds of processes, it being particularly important, in most cases, for the material to be loaded over the whole periphery of the container in a regulable manner, and as evenly as possible. In such plant, this problem has, in the past, been solved, for example, by the material being scraped off all the way round from an annular plate surrounding the container, with the help of an adjustable guide-blade/stripper. This device fails, however, in the case of materials—such as, for example, dust waste and other waste—which, because of their condition, adhere to such strippers and further hinder their even operation, which in any case is only limited. Other cylindrical reaction vessels—such as shaft furnaces or blast furnaces—are regulably charged through a central charging cone. With such devices, too, the evenness of the peripheral distribution of the material is dependent upon its flow characteristics, and they are therefore of only limited effectiveness and application. These charging devices generally must also operate on a periodic basis and therefore, during the introduction of the material, do not give the desired tight seal of the processing container with respect to the outside atmosphere. Moreover, these methods of charging are also dependent upon the behaviour of the material, which is determined by its nature, and during charging, no mixing or separation of different components of the material can be carried out.

With furnaces having vertical, cylindrical combustion chambers, it is possible to carry out a continuous and even charging, simply and reliably, with fuels of uniform composition—such as, for example, coal, lignite, coke, peat, and the like. It becomes difficult, however, when use is made of fuels—such as, in particular, waste materials such as dust waste or the like—which are of constantly changing consistency and variable calorific value. These waste materials can be solid, pulverulent, or even liquid. In order to obtain, with such fuels, a thermal value trend which is as uniform as possible, and also to obtain a consistency usable to some degree, waste products available are intimately mixed together before introduction into the combustion chamber. If, for example, relatively thin-flowing or viscous waste material—such as sludge from a settling plant—is present in the aggregate, then continuous mixing with the other waste material can be achieved only with difficulty, because the liquid constituents always separate off again prematurely and flow together at the lowermost points, i.e., at the bottom of the container.

Furthermore, with cylindrical processing containers of this kind, there also exists the basic problem of sluicing the materials in, in a simple manner, against the pressure obtaining in the container, or while maintaining a vacuum. In known chargng devices, this problem is solved in a very inconvenient and incomplete manner by spacing several loading cylinders on the outside of the container, which cylinders are filled individually, one after the other, from a rotating distributor plate, by means of strippers and are closed at the top and then are emptied by the opening of discharge means at the bottom, or the material is sluiced into the container.

It is an object of the invention to avoid these disadvantages.

According to the invention, in charging devices of the type initially described for evenly introducing materials into vertical, cylindrical processing containers, all the above-mentioned difficulties and drawbacks are avoided by fitting, along the upper outside edge of the processing container, one or more supply platforms open towards the inside, which continuously taper in their radial width, all the way round, and are closed by means of a spirally drawn-in outer wall. By this means, the material on these platforms, which is fed thereto in a direction tangential to the processing container, is evenly distributed over the whole circumference as a result of the centripetal component of thrust, and the material overflows into the container from all sides at its natural angle of slope.

With this charging device, two or more spirally tapered supply platforms can be fitted in series on the upper edge of the processing container. Expediently, however, two or more spirally tapered supply platforms can be fitted, one above the other. Here, if necessary, the upper supply platform can be designed as a channel, to accommodate liquids, and can be provided with a flanged inner edge. The two spirally tapered supply platforms can also be arranged to run in opposite directions in these charging devices.

In a preferred form of the charging device according to the invention, the base of at least one of the spirally tapered supply platforms for the solid material is formed so as to enable liquid to pass therethrough—it may be formed, for example, as a sieve—and a closed channel is arranged thereunder. This channel can serve either to supply, under pressure, additional liquid constituents—e.g., sludge from a settling plant, oil sludge, or the like, to the solid matter on the perforated base of the supply platform, and so to effect mixing; or the fluid constituents can be collected and drawn off from the material in the channel, for example, by means of drying waste gases. With this arrangement, both parts, separated by the perforated base, can have a head of pressure while on the spiral supply platform, whereby the mixing and/or separation of the material is promoted or controlled; in the first case, the intimate mixing of the solid and liquid or sludgy substances is carried out directly prior to transfer to the combustion chamber, in such a way that re-separation of the different constituents is no longer possible, prior to combustion.

Finally, in this charging device, an annular—preferably likewise spirally tapered—chamber, is fitted on the outside of the processing container, roughly at the same height as the combustion compartment, and communicates with the interior of the main vessel through peripheral openings in the wall thereof. By means of this annular chamber, it is possible to introduce liquid or viscous waste materials, under pressure, directly into the combustion space, such materials being preferably readily inflammable substances, such as benzene tailings.

In the drawing, several preferred embodiments of the charging device for vertical, cylindrical processing containers according to the invention, are illustrated:

Figure 1:
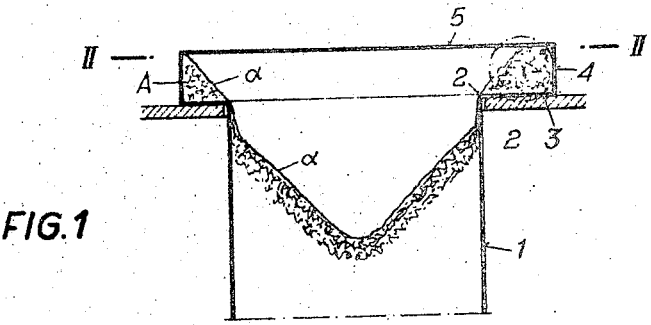
FIGS. 1 and 2 show, respectively, an axial section and a plan (with the cover removed), of a simple container with a supply platform fitted at the top.
Figure 2:
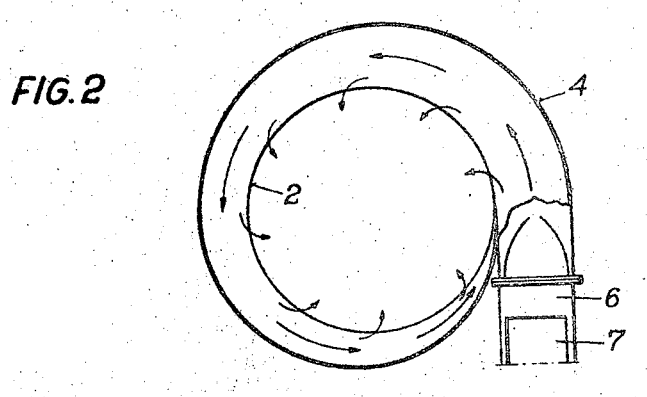
Figure 3:
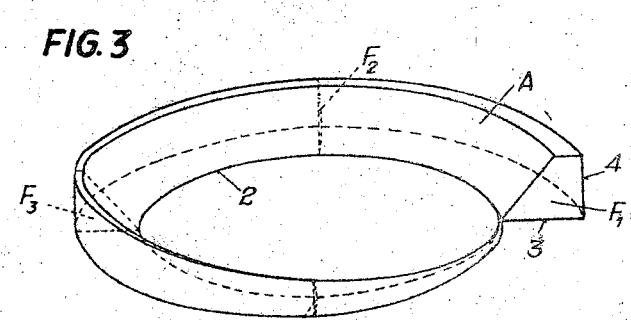
FIG. 3 shows, in perspective the mass of the material to be loaded, distributed on the supply platform and with its cross-section continuously decreasing along the entire periphery.

In FIGS. 1–3, the basic principle of the invention is illustrated in terms of a simple plant including a vertical, cylindrical processing container. On the upper edge 2 of the vertical, cylindrical processing container 1, is fitted a supply platform 3, which is open towards the inside and continuously tapered along the whole periphery of the container, and whose outer wall 4 is drawn in spirally all the way round. The entire container is closed by a cover 5. A feed cylinder 6, which carries a charging hopper 7, discharges at the point of entry to the supply platform—that is, at its broadest cross-section. In FIG. 1 the supply platform 3, 4 is filled, the material A to be charged bearing at its natural angle of inclination α against the inner edge of the platform 3, open towards the container 1, and being distributed roughly wedge-shaped, along the whole periphery, and having a continuously diminishing cross-section $F_1$–$F_2$–$F_3$–$F_4$ (FIG. 3). If the material A is now evenly pushed on through the feed cylinder 6—e.g., by means of a piston—then it will move on the spirally tapered supply platform 3, along the whole periphery of the container in the direction of the peripheral arrows, (FIG. 2) and will then, because of the stepwise evenly diminishing bearing surface at all peripheral points, break off in pieces of practically the same size, fall over the edge 2 of the platform into the container, as shown in FIG. 2 by the curved arrows, and will finally be heaped up in a corresponding manner, in the container, again in an even concentric distribution and at an angle of slope α. During this feeding action, the material is at all points pressed against the outer wall of the supply platform 3, whereby its continuous longitudial distribution on the supply platform 3 and fully symmetrical peripheral overflow into the processing container are ensured.

Figure 4:
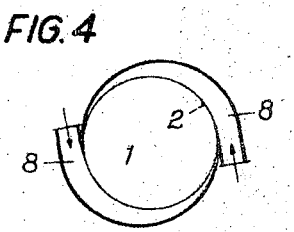
FIGS. 4 and 5 show, schematically, two processing containers having a plurality of supply platforms arranged in series on their periphery.
Figure 5:
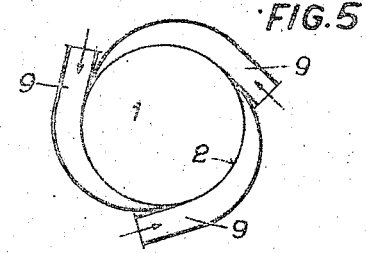

In the two systems shown in FIGS. 4 and 5, there are arranged in series along the upper edge 2 of the processing container 1, two supply platforms 8, or three such platforms 9, which are each similarly charged with material simultaneously and at the same intensity. These part-platforms may, for example, extend over equal portions of the periphery. However, depending upon special circumstances—such as, for example, varying available quantities or consistency of the material—they can extend over peripheral stretches of different sizes.

Figure 6:
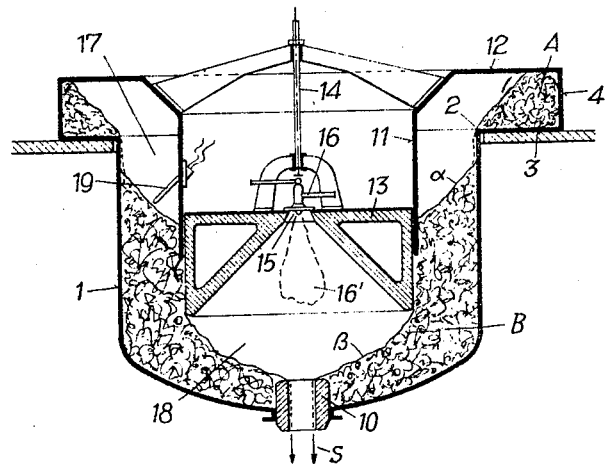
FIG. 6 shows an axial section of a simple flame furnace with an annular loading space and a sunk cover and with a single supply platform.
Figure 7:
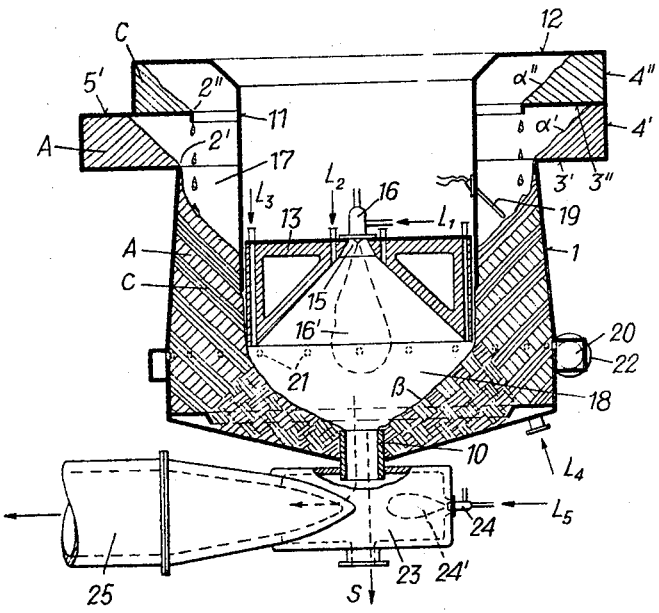
FIGS. 7 and 8 illustrate an axial section and a plan, respectively, of another form of such a flame furnace, but with two supply platforms, arranged one over the other, and with an annular chamber fitted outside the jacket of the container.
Figure 8:
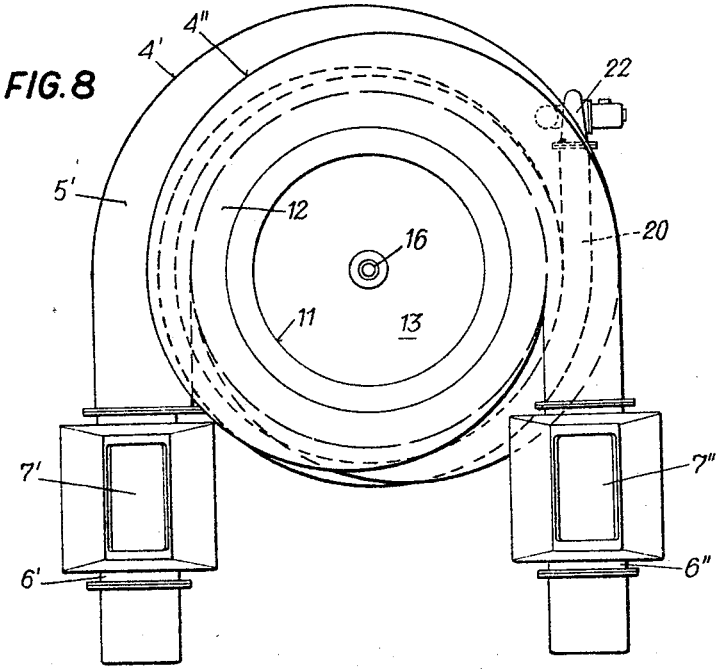

The flame furnace illustrated in FIG. 6 forms a particularly good example of the use to which the charging device according to the invention may be put. Here again, the supply platform 3 of the material A and having a spiral outer wall 4 is fitted at the upper edge 2 of the cylindrical processing container 1. In the base of the main container 1 is a discharge orifice 10 for the melt and also in the container 1 there is concentrically fitted a cylinder 11 of smaller diameter, which does not extend so far down. Both cylinders 1 and 11 are connected at the top by the annular cover 12, and the inner cylinder 11 is closed at the bottom by the conical cover 13, which is lined with fire-resisting material and which is adjustable in height by means of the threaded spindle 14, and in the upper opening 15 of which is fitted the burner 16 for heating the flame furnace. Between the two cylinders 1 and 11 is the annular compartment 17, into which material is to be filled, and below the inner cylinder 11 there is the combustion compartment 18, which is sealed by the conical cover 13. The charging of this flame furnace with material A—e.g., fuel, or dust waste, or other waste products, takes place in the same way as in the equipment illustrated in FIG. 1, by regulable peripheral feed over the supply platform 3, whereby the material A falls into the annular chamber 17 in an even concentric distribution, and at its natural angle of slope α, and forms, at the base of the main container 1, a sloping heap B having an angle of slope β. This lower sloping heap can be regulated as desired by adjusting the height of the conical cover 13 so as to cater for the widest variety of charge material or fuels. Finally, there is inserted into the annular space a feeler 19—e.g. an electrode—which, when the fuel reaches a certain height, interrupts the passage of fuel to the supply platform. After starting up the flame 16' of the burner, the material B begins to burn or melt after a certain temperature has been reached, and after this the residues flow out, through the orifice 10 in the base, into a granulating vessel as fused masses S. FIGS. 7 and 8 show another flame furnace which operates on the same principle as that of FIG. 6 but which is fitted with two spirally tapered supply platforms 3', 4' and 3", 4" which are arranged one above the other and which here are arranged to run in opposite directions to each other and can be supplied independently of each other, from separate material bunkers having their own charging gear, with different types of fuels or charge materials which are difficult to mix together. Thus, for example, a conventional fuel A—such as coal, lignite, or peat—can be supplied along the lower supply platform 3', 4' and the upper supply platform 3", 4" is fed with periodically occurring waste C, the two materials A and C settling on the platforms at their natural angles of slope α', α", and being brought into the annular space 17 at their own rhythm, so that the thermal value of the total charge can be influenced or, within certain limits, adjusted by the completely independent adjustment of the charging rates of the two components. There is fitted on the outside of the processing container 1 of this flame furnace, and roughly at the same height as the combustion compartment 18, an annular chamber 20, which is likewise spirally tapered, and from which peripheral openings 21 lead into the combustion compartment, and to which is fed, by means of the solid-matter pump 22, a fluid or viscous fuel—in particular, readily inflammable waste materials such as benzene tailings, for example—which fuel is passed under a certain excess pressure, through the peripheral openings 21 of the processing container directly into the heating zone of the combustion compartment 18. Also, in this system there are fitted, at widely separated points, nozzles $L_1$–$L_5$ through which air is forced into the combustion compartment so as to maintain the combustion process. The fused residues S again flow out through the orifice 10 in the base. At the orifice 10 there is fitted an equalising chamber 23 in the wall of which, expediently, there is inserted an auxiliary burner 24, and to which the waste-gas pipe 25 is connected. The combustion gases which pass into this equalising chamber 23 through the opening 10 in the base, are additionally heated by the flame 24' of the auxiliary burner 24, and are passed on through the waste-gas pipe 25, to plant provided for the utilisation of the heat from the waste gas. In a remote-source heating plant, it is possible with the help, for example, of a single such flame furnace with two—or even more—separate supply platforms for different materials, to heat a steam boiler connected thereto with, for instance, conventional fuel and additionally, with dust or other waste materials.

In processing containers which are equipped with the charging device according to the invention, the unit for feeding the material to the supply platform is sealed against the outside atmosphere. This feed is achieved, for example, by pressure-operated cylinders, screw conveyors or pumps for handling heavy materials, which are preferably protected against back-flow of the material fed in, by means known in themselves, e.g., check valves, control slides and the like, and furthermore the combustion air is supplied, pressure-regulated, at various points. The entire system, including the combustion compartment, or the combustion- or flame-chamber, as well as the supply platform, therefore remains continuously sealed against the outside atmosphere during the processing, and flames can, for example, never blow back from the furnace compartment into the supply platform in which, as experience has shown, outbreaks of fire can only be extinguished with difficulty, which outbreaks with, for example dust waste as the fuel—and particularly with plastics waste—would cause serious interference with operations because of fusing and clogging in the feeding device.

Figure 9:
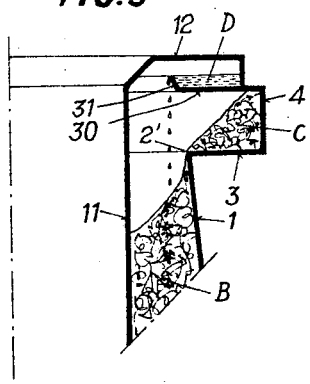
FIG. 9 shows an arrangement with a supply platform for solid materials, and a platform located thereover for liquids

FIG. 9 shows, as a radial section, a charging device with two spirally tapered supply platforms 3, 4 and 30, 31. As in the previously described examples, the lower supply platform 3, 4 is used for supplying any solid fuel C, dust-waste for example. The upper supply platform 30 is formed as a channel and is provided with a flanged inner edge 31, so that a liquid or viscous fuel D can be brought from this channel-shaped platform 30, 31 into the annular filling compartment 1, 11 of the processing container to give an even peripheral distribution, in which container it mixes with the solid charge present therein.

Figure 10:
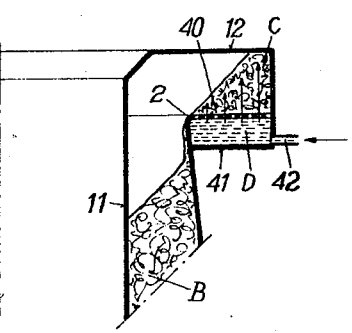
FIGS. 10 and 11 show a charging device, the supply platform of which is divided by a sieve-like intermediate base into an upper section for solid materials and a closed canal for liquids located thereunder—this being for two different applications.

FIG. 10 shows another advantageous form of the spiral supply platform, the base 40 of which is here formed as a sieve, and under which is arranged a closed channel 41 with a supply pipe 42. A solid fuel or waste material is fed to the upper part of the supply platform with the sieve-like base 40, and through the channel 41 located thereunder, liquid constituents or waste materials D—such as, for example, sludge from a settling plant, oil sludge or the like, are pressed into the solid material 4, through the perforated base 40 under pressure, and so are mixed with the latter only shortly before passage into the filling compartment of the combustion chamber, so that undesirable separation of the two components is no longer possible.

Figure 11:
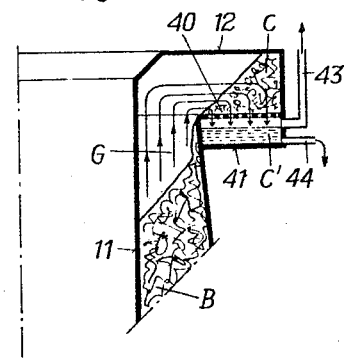

Finally, in FIG. 11 there is illustrated yet another variant of the charging device, which in construction corresponds completely to that of the last example shown in FIG. 10, yet which is intended for another use. The material B contained in the annular charging compartment 17, together with the material C located on the perforated base 40 of the supply platform, is pre-dried by a regulable part of the combustion gases G that has passed through, the excess liquid C', dripping through the perforated base 40, being received in the channel 41 positioned thereunder, and being drained away through the pipe 44, if necessary through a shut-off valve. The gas escapes through a tube 43 fitted at the upper edge of the channel 41. With this arrangement the exchange of material and/or heat is also favoured by the fact that in the supply platform 40, 41, fitted at the top of the processing container 1, there is a very large cross-section with a correspondingly enhanced effect as compared with the cross-section zone where overflow into the main container 1 occurs. If the processing container is a shaft furnace or a blast furnace, for example, a funnel can be formed by the even and continuous peripheral introduction of the material, in which funnel the coarse constituents form layers which become smaller radially towards the outside, so that the gases of reaction coming up from below can rise in the middle of the cross-section of the furnace, with less resistance, edge interference being avoided. When the hot gases pass through the two parts of the supply platform 40, 41, they are cooled because of the increase in cross-section and diminution of speed, and they leave behind the charge dust, as it is called. In flame furnaces, as shown in FIGS. 6 and 7, in which the hot waste gases are conducted through the opening 10 in the bottom to the main 25, any desired part of the waste gases can be drawn off through the annular charging compartment 17 and can be used for drying or pre-heating the material to be charged. Expediently, these "side gases" may be returned to the waste-gas pipe at a suitable point.

I claim:

1. In a vertical substantially cylindrical processing container, at least one charging platform mounted along the periphery of an upper part of said container, and a wall bounding said platform on the outside, said platform tapering in width radially inwardly in the circumferential direction, whereby material forced along said platform falls off the radially inner edge thereof into the main body of the container.

2. A container according to claim 1, including means sealing the container from the atmosphere.

3. A container according to claim 1, wherein at least two of said platforms are mounted in series along the periphery of the upper part of the container.

4. A container according to claim 1, which includes a channel for liquid mounted above said platform, said channel having a radially inner wall which is of less height than its radially outer wall whereby liquid may flow over the inner wall into the container.

5. A container according to claim 1, wherein two of said platforms are mounted along the periphery of the upper part of the container and are tapered in opposite circumferential directions.

6. A container according to claim 1, wherein the platform is formed with openings to allow the passage of liquid therethrough, and which includes a channel mounted under said platform enclosed except for the openings in the platform, whereby a pressure differential may be maintained between the platform and the channel for transfer of material therebetween by the pressure differential.

7. A container according to claim 1, which includes an annular chamber extending around the periphery thereof, the container wall being formed with apertures communicating with said chamber.

8. A container according to claim 7, wherein said chamber is spirally tapered in width radially inwardly.

9. A container according to claim 1, including a vertical substantially cylindrical partition in said container forming, with the wall of said container, an annular space, the material from said platform falling into said annular space.

References Cited

FOREIGN PATENTS 1,389,470   1/1965   France.
1,012,090  12/1965   Great Britain.

CHARLES J. MYHRE, *Primary Examiner.*